(12) United States Patent
Tanzi et al.

(10) Patent No.: US 12,447,822 B2
(45) Date of Patent: Oct. 21, 2025

(54) MOTOR VEHICLE

(71) Applicant: FERRARI S.P.A., Modena (IT)

(72) Inventors: Alessandro Tanzi, Modena (IT); Erik Masoero, Modena (IT); Pasquale Vitiello, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/329,991

(22) Filed: Jun. 6, 2023

(65) Prior Publication Data

US 2023/0398869 A1 Dec. 14, 2023

(51) Int. Cl.
*B60K 35/00* (2024.01)
*B60K 35/23* (2024.01)
*B60K 35/28* (2024.01)

(52) U.S. Cl.
CPC .............. *B60K 35/00* (2013.01); *B60K 35/23* (2024.01); *B60K 35/28* (2024.01); *B60K 2360/166* (2024.01); *B60K 2360/167* (2024.01); *B60K 2360/176* (2024.01); *B60K 2360/31* (2024.01); *B60K 2360/334* (2024.01); *B60K 2360/66* (2024.01)

(58) Field of Classification Search
CPC .............. B60K 35/00; B60K 2370/167; B60K 2370/176; G02B 26/02; G02B 27/0101; G02B 5/0825; G02B 27/01; B60W 50/14
See application file for complete search history.

(56) References Cited

U.S. PATENT DOCUMENTS

| | | | |
|---|---|---|---|
| 3,276,813 A | 10/1966 | Shaw | |
| 7,561,966 B2 * | 7/2009 | Nakamura | ........... G01C 21/365 345/581 |
| 7,817,022 B2 * | 10/2010 | Uematsu | ............... G02B 27/01 340/441 |

(Continued)

FOREIGN PATENT DOCUMENTS

| | | | | |
|---|---|---|---|---|
| DE | 102016124987 A1 * | 6/2018 | ......... G02B 27/0101 |
| JP | H07339 Y2 * | 1/1995 | ............. B60K 35/00 |

(Continued)

OTHER PUBLICATIONS

Italian Search Report for Application No. 102022000012149; Filing Date: Jun. 8, 2022; Date of Mailing—Jan. 23, 2023, 8 pages.

*Primary Examiner* — Olga V Merkoulova
(74) *Attorney, Agent, or Firm* — CANTOR COLBURN LLP

(57) ABSTRACT

A motor vehicle comprising a passenger compartment defining a seat for a driver, a dashboard arranged within the passenger compartment, delimiting the passenger compartment at the front with reference to a normal forward moving condition of the motor vehicle and arranged in front of the seat; a windshield delimiting the passenger compartment and contiguous with the dashboard; and a head-up display configured to form at least one virtual image containing an item of information associated with an operating state of the motor vehicle on a first region of the windshield; the dashboard comprises a second region contiguous with the windshield; the head-up display comprises at least one projector housed in the second region and the first region delimits the windshield on the side of the dashboard.

11 Claims, 2 Drawing Sheets

(56) References Cited

U.S. PATENT DOCUMENTS

| | | | | |
|---|---|---|---|---|
| 8,049,609 B2* | 11/2011 | Takahashi | ............... | B60Q 3/78 340/436 |
| 9,517,776 B2* | 12/2016 | Graumann | .............. | G06F 3/013 |
| 10,712,816 B2* | 7/2020 | Rao | ........................ | G06F 3/013 |
| 11,241,960 B2* | 2/2022 | Watanabe | ................ | B60R 1/24 |
| 11,249,308 B2* | 2/2022 | Yamashita | ......... | G02B 27/0101 |
| 11,285,812 B2* | 3/2022 | Ford | .................... | B60R 16/033 |
| 11,505,123 B2* | 11/2022 | Lu | ....................... | H04N 13/239 |
| 11,526,009 B2* | 12/2022 | Fischer | .............. | C03C 17/3649 |
| 2008/0186156 A1* | 8/2008 | Uematsu | ............... | B60K 35/00 340/441 |
| 2009/0295681 A1* | 12/2009 | Kaminski | ......... | B32B 17/10165 428/426 |
| 2010/0066925 A1* | 3/2010 | Nagahara | ........... | G02B 27/0101 349/11 |
| 2014/0348389 A1* | 11/2014 | Graumann | .............. | G06F 3/013 382/104 |
| 2016/0185219 A1* | 6/2016 | Sakata | ................... | G01C 21/36 701/36 |
| 2016/0196098 A1* | 7/2016 | Roth | ....................... | G06F 3/012 715/761 |
| 2016/0209647 A1* | 7/2016 | Fürsich | .............. | G02B 27/0075 |
| 2017/0148216 A1* | 5/2017 | Birman | ................ | G01J 1/0425 |
| 2019/0041222 A1 | 2/2019 | Grewal et al. | | |
| 2019/0056782 A1* | 2/2019 | Rao | ........................ | A61B 3/113 |
| 2019/0107886 A1* | 4/2019 | Saisho | .............. | G01C 21/3632 |
| 2019/0202177 A1* | 7/2019 | Manz | ...................... | B32B 3/263 |
| 2019/0299784 A1* | 10/2019 | Nakano | ................ | G02B 5/0825 |
| 2021/0370775 A1* | 12/2021 | Yamada | ............... | B60K 35/213 |
| 2022/0413288 A1* | 12/2022 | Lottes | ...................... | B60R 1/12 |

FOREIGN PATENT DOCUMENTS

| | | |
|---|---|---|
| WO | 2008040899 A1 | 4/2008 |
| WO | 2021110889 A1 | 6/2021 |
| WO | 2022073894 A1 | 4/2022 |

* cited by examiner

MOTOR VEHICLE

CROSS-REFERENCE TO RELATED APPLICATIONS

This patent application claims priority from Italian patent application no. 102022000012149 filed on Jun. 8, 2022, the entire disclosure of which is incorporated herein by reference.

TECHNICAL FIELD

The invention relates to a motor vehicle.

BACKGROUND

Motor vehicles are known, which comprise a body defining a passenger compartment and an engine.

The passenger compartment comprises, in turn, at least a pair of front seats and is delimited, at the front, by a dashboard and by a windshield arranged in front of the front seats, with reference to a normal forward moving direction of the motor vehicle.

In a known manner, one of the front seats defines a cockpit for a driver.

The dashboard accommodates, in a known manner, a control panel, which is arranged in a position visible to the driver and comprises a plurality of instruments, such as, for example, a speedometer indicating the instantaneous speed of the motor vehicle and a revolution-counter indicating the number of revolutions of the drive shaft of the engine.

The control panel further comprises, in some manufacturing solutions, an indication of the residual quantity of fuel, an indication of the temperature of an engine cooling liquid, a watch and an odometer.

Motor vehicles comprise, in a known manner and in addition to the control panel, a head-up display.

The head-up display is designed to display, on the windshield, additional virtual information representative of characteristic quantities of the state of the motor vehicle in a position that is visible to the driver without having to look away from the road ahead.

More precisely, geometrical optics has taught us about optical systems, such as, for example, the human eye, which are capable of forming a real or virtual image representing an object.

More in particular, objects emit or diffuse a light beam in all directions.

The optical system consists of a plurality of reflecting and refracting surfaces capable of deflecting the rays of the light beam coming from a point of the object to a point of the real or virtual image.

By so doing, the optical system determines an association between each point of the object and a corresponding point of the real or virtual image.

Each point of the object, in particular, emits a divergent light beam diverging from the object point itself.

The optical system alters the divergent light beam diverging from the object point into another light beam that can be convergent or divergent.

When the emergent rays originating from the optical system and associated with each point of the object actually intersect one another in the corresponding point of the image, the optical system provides a real image of the object.

On the other hand, when the extensions of the emergent rays originating from the optical system and associated with each point of the object intersect one another in the point of the image, the optical system provides a virtual image of the object.

Known head-up displays comprise, in turn:
a processing unit;
a projection unit controlled by the processing unit and designed to generate a light beam; and
a plurality of mirrors arranged so as to reflect the light beam onto a windshield.

The windshield deflects the light beam.

The mirrors and the windshield form, in known solutions, an optical system configured to form a virtual image on the outside of the windshield and at a distance other than zero from the windshield.

The automotive industry feels the need to reduce or even eliminate control panels, ensuring at the same time that the information needed for driving is available to the driver.

Furthermore, said information has to become available to the driver only when it is actually needed for a safe driving.

In addition, said information has to be made available to the driver avoiding the risk of distraction of the driver, in particular preventing the driver from having to continuously change the orientation of the look.

Finally, said information has to made available reducing, at the same time, the aerodynamic resistance of the motor vehicle.

SUMMARY

The object of the invention is to provide a motor vehicle, which is capable of fulfilling at least one of the needs discussed above.

The aforesaid object is reached by the invention, as it relates to a motor vehicle as defined in claim 1.

BRIEF DESCRIPTION OF THE DRAWINGS

The invention will be best understood upon perusal of the following detailed description of two preferred embodiments, which are provided by way of non-limiting example, with reference to the accompanying drawings, wherein.

DESCRIPTION OF EMBODIMENTS

Figure 1:
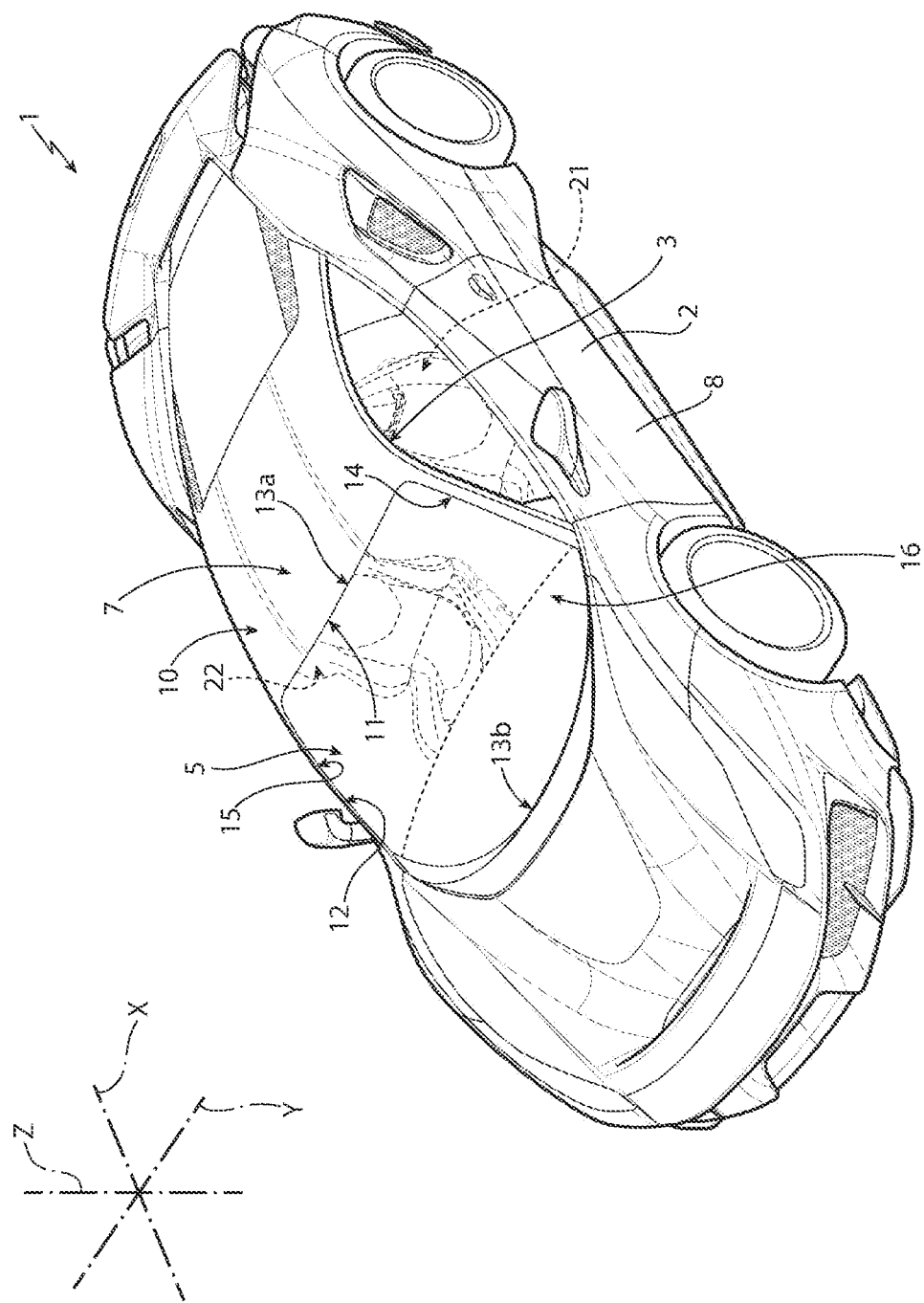
FIG. 1 is a perspective view of a motor vehicle according to the invention.
Figure 2:
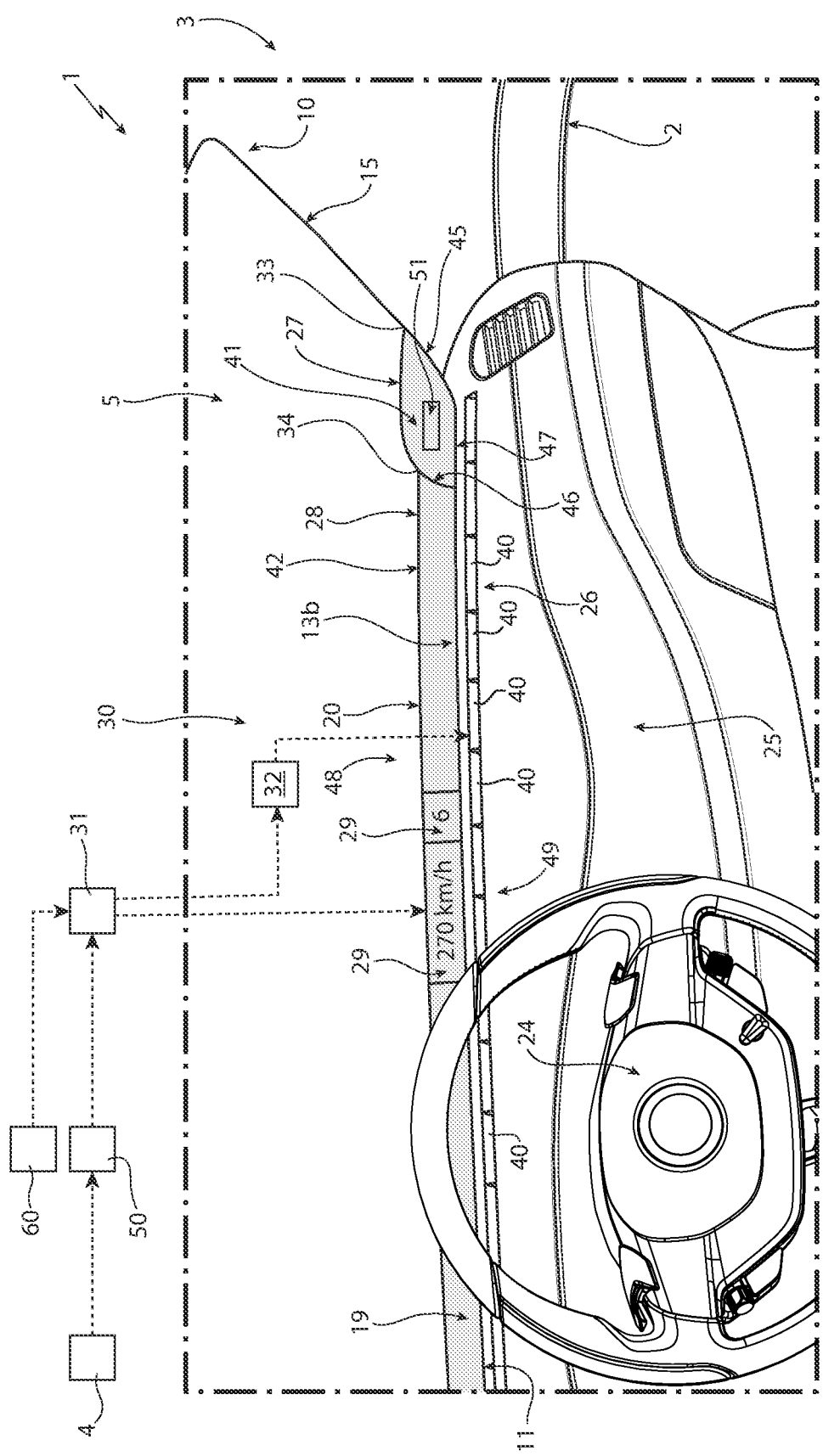
FIG. 2 is a front portion of a passenger compartment of the motor vehicle of FIG. 1, with parts removed for greater clarity.

With reference to the accompanying Figures, number 1 indicates a motor vehicle comprising a body 2 defining a passenger compartment 3 and an engine 4 (only schematically show in FIG. 2).

The motor vehicle 1 is a top-of-the-range motor vehicle designed both for a conventional urban/suburban use and for a racing track use.

Hereinafter, expressions such as "at the top", "at the bottom", "at the front", "at the back" and others similar to them are used with reference to normal forward moving conditions of the motor vehicle 1.

The motor vehicle 1 further comprises:
a windshield 5 delimiting the passenger compartment 3 at the front;
a backrest (not shown) delimiting the passenger compartment 3 at the back;
a roof 7 delimiting the passenger compartment 3 at the top; and a pair of doors 8, which are hinged to the body 2 and are movable between a closed position, in which they laterally delimit the passenger compartment 3 and prevent people from getting into/out of the passenger compartment 3, and an open position, in which they allow people to get into/out of the passenger compartment 3.

Furthermore, it is possible to define:

a longitudinal axis X integral to the motor vehicle 1, which, in use, is horizontal and parallel to a normal forward moving direction of the motor vehicle 1;

a transverse axis X integral to the vehicle 1, which, in use, is horizontal and orthogonal to the axis X; and an axis Z integral to the vehicle 1, which, in use, is vertical and orthogonal to the axes X, Y.

More in detail, the windshield 5 comprises, in turn:

a frame 10 a rim 11 defining an opening 12; and a front window 16 engaging the opening 12, support by the rim 11 and arranged at the front relative to a normal forward moving direction parallel to the direction X.

More in detail, the rim 11 has a quadrangular shape and comprises:

a pair of upper and lower cross members 13a, 13b, which are opposite one another; and a pair of side pillars 14, 15, which are opposite one another and extend crosswise between respective ends of the cross members 13a, 13b.

The cross members 13a, 13b have a main extension parallel to the axis Y.

The cross member 13a is arranged at the back of the cross member 13b.

The motor vehicle 1 further comprises:

a pair of front seats 21, 22 housed in the passenger compartment 3; and a dashboard 25 arranged under the windshield 5 and in front of the seats 21, 22.

In particular, the seat 21 defines a cockpit for a driver and the motor vehicle 1 comprises a steering wheel 24 projecting from the dashboard 25 towards the seat 21.

The dashboard 25 comprises an end region 26 contiguous with the window 16 and known in the automotive industry as "valance panel".

The region 26, in the specific case shown herein, is curved.

The motor vehicle 1 further comprises a head-up display 30 configured to form a plurality of virtual images 29, 51 associated with an operating state of the motor vehicle 1 on a region 19.

With reference to FIG. 2, the head-up display 30 basically comprises:

a processing unit 31; and a projection unit 32 controlled by the processing unit 31 and designed to project a light beam onto the windshield 5.

The projection unit 32 and the windshield 5 form an optical system configured to form the virtual images 29, 51.

The term "virtual images" identifies images whose points correspond to the intersection of the extensions of the light rays generated by the head-up display 30.

Advantageously, the projection unit 32 comprises a plurality of projectors 40 housed in the region 26 of the dashboard 25 and the region 19 delimits the windshield 5 on the side of the dashboard 25.

In other words, the head-up display 30 forms the images 29, 51 on the region 19 of the windshield 5 and, hence, the images 29, 51 are at a zero distance from the windshield 5.

In the specific case shown herein, the region 19 faces the outside of the motor vehicle 1 and is arranged, in use, above the dashboard 25.

The projectors 40 preferably are miniature micro-projector arranged in sequence along the region 26 of the dashboard 25.

More in detail, the region 19 extends between the pillars 14, 15 and is delimited, at the bottom, by the cross member 13b and, at the top, by an edge 20.

The edge 20 comprises, in turn:

a central segment 28, which is spaced apart from the pillars 14, 15 and is substantially parallel to the cross member 13b; and a pair of end segments 27.

Each segment 27 is interposed between a relative pillar 14, 15 and a respective end of the segment 28.

More precisely, each segment 27 comprises a pair of ends 33, 34 opposite one another. The end 33 of each segment 27 is arranged in the area of the respective pillar 14, 15 and the end 34 is arranged in the area of the segment 28.

The region 19 defines:

a pair of side areas 41; and a central area 42 interposed between the areas 41.

Each area 41 is quadrangular and is delimited by:

a segment 45 of a respective pillar 14, 15;

a respective segment 27 of the edge 20;

a respective segment 46 extending between the end 31 of the respective segment 27 and the cross member 13b; and a respective segment 47 of the cross member 13b.

The area 42 also is quadrangular and is delimited by:

opposite segments 46 of respective areas 41; and opposite segments 48, 49 defined by the edge 20 and by the cross member 13b, respectively, and extending between the segments 46.

The dashboard 25 preferably lacks a control panel.

The processing unit 30 is programmed, during a urban/suburban use of the motor vehicle 1, to have the projection assembly 32 form images 29 representative, as an example and not in a limiting manner, of basic driving information, such as speed of the motor vehicle 1 and number of revolutions of the engine 4, and of messages of a driver assistance system 60 of the motor vehicle 1.

The processing unit 30 is further programmed, during the use of the motor vehicle 1 on a track, to have the projection assembly 32 form further images 29 also representative of the ideal position to be assumed by the motor vehicle 1 along the track in order to minimize lap times and/or increase the overall driving performance.

The images 29 are, in addition, representative of indicators of position of further motor vehicles 1 on the track and of accessory information, such as flags, lap time, ranking, etc.

In a preferred embodiment, the motor vehicle 1 comprises a pair of video cameras 50 (only schematically shown in FIG. 2), which are designed to capture images representative of the scenario surrounding the motor vehicle 1 on the sides and at the back.

The processing unit 31 is programmed to receive, from the video camera 50, a signal representative of the captured images and to have the projection unit 32 form the virtual images 51 in the respective areas 41.

In said preferred embodiment, the motor vehicle 1 does not comprise rear-view mirrors.

The operation of the motor vehicle 1 is described, at first, with reference to a urban/suburban use.

The head-up display 30 forms the images 29 on the region 19 of the windshield 5.

The images 29 are, in the specific case shown herein, representative of the basic driving information of the motor vehicle 1, such as speed for the motor vehicle 1 and number of revolutions of the engine 4, and of messages of a driver assistance system 60 of the motor vehicle 1.

The driver visually accesses said images 29 without looking away from the windshield 5 and also using his/her peripheral vision.

In a preferred embodiment, the head-up display 30 forms, in the areas 41 of the region 19, the images 51 captured by the video cameras 50 and representative of the scenario surrounding the motor vehicle 1 on the sides and at the back.

In other words, the areas 41 replace the rear-view mirrors of the motor vehicle 1.

With reference to the track use of the motor vehicle 1, the images 29 are representative, as an example and not in a limiting manner, of the aforesaid basic driving information and, in addition, also of the ideal position to be assumed by the motor vehicle 1 along the track in order to minimize lap times and/or increase the overall driving performance.

The images 29 are, in addition, representative of indicators of position of further motor vehicles 1 on the track and of accessory information, such as flags, lap time, ranking, etc.

The disclosure above reveals evident advantages that can be obtained with the invention.

More in detail, the projectors 40 are accommodated in the region 26 of the dashboard 25 and the images 29, 51 are formed in the region 19 of the windshield 5.

This reduces or even totally eliminates the control panel of the dashboard 25, proving the driver, on the other side, with information on the state of the motor vehicle 1 by means of the images 29, 51 formed on the region 19 of the windshield 5.

By so doing, designers have more freedom in conceiving the geometries and the dimensions of the dashboard 25, without jeopardizing driving safety.

In addition, the aforesaid information of the state of the vehicle 1 becomes available to the driver only when the motor vehicle 1 is running, namely only when it is actually necessary for a safe driving.

Thanks to the fact that the images 29, 51 are formed on the region 19 of the windshield 5 contiguous with the region 26 of the dashboard 25, the driver can basically acquire the information without looking away from the windshield 5 and with a limited risk of distraction that could cause accidents.

More precisely, the images 29, 51 are perceived as focussed from any point of the motor vehicle 1, with no parallax effects.

The region 26 is screen printed in a dark colour, in particular black, so as to increase the visibility of the images 29, 51 on the windshield 5.

The processing unit 31 is programmed to receive, from the video camera 50, the signal representative of the images 51 associated with the side/rear surroundings of the motor vehicle 1 and to have the projection unit 32 form the images 51 in the respective peripheral areas 41 of the region 19 of the windshield 5.

By so doing, the rear-view mirrors can be removed from the motor vehicle 1, thus consequently reducing the aerodynamic resistance of the motor vehicle 1.

In said preferred embodiment, the motor vehicle 1 does not comprise rear-view mirrors.

In case the motor vehicle 1 is used on a track, the processing unit 31 forms the images 29 representative, as an example and not in a limiting manner, of the aforesaid basic driving information and, in addition, also of the ideal position to be assumed by the motor vehicle 1 along the track in order to minimize lap times.

Finally, the motor vehicle 1 according to the invention can be subjected to changes and variations, which, though, do not go beyond the scope of protection set forth in the appended claims.

In particular, the projector 40 could be a LED display or a liquid-crystal display located in its focus.

The invention claimed is:

1. A motor vehicle (1) comprising:
    a passenger compartment (3) defining a seat (21) for a driver;
    a dashboard (25) arranged within said passenger compartment (3), delimiting said passenger compartment (3) at the front with reference to a normal forward moving direction of said motor vehicle (1) and arranged in front of said seat (21);
    a windshield (5) delimiting said passenger compartment (3) and contiguous with said dashboard (25); and
    a head-up display (30) configured to form at least a first virtual image (29, 51) containing an item of information associated with an operating state of said motor vehicle (1) on a first region (19) on the windshield (5) at a zero distance from the windshield, wherein said first region (19) is at a bottom portion of the windshield (5) and is screen printed in black;
    wherein said dashboard (25) comprising a curved second region (26) contiguous with a front windshield (16) of said windshield (5);
    wherein said head-up display (30) further comprises at least one projector (32) housed in said curved second region (26) configured to form the virtual images (29, 51) at different locations along a length of said first region (19) spanning between pillars (14, 15), and in that said first region (19) is defined by said windshield (5) and delimits said windshield (5) on the side of said dashboard (25); and
    wherein said head-up display (30) is operatively connected to at least one detection means (50) configured to detect a signal representative of the surroundings of said motor vehicle (1) in a position at the back and/or on the side of said windshield (5), with reference to said normal forward moving direction of said motor vehicle (1), and is further configured to form a further virtual image (51) associated with said signal on at least one end area of said first region (19), such that said first region (19) is operable to display images representative of the scenario surrounding the motor vehicle (1) on the sides and at the back, thereby replacing rear-view mirrors.

2. The motor vehicle according to claim 1, wherein said pair of pillars (14, 15) are spaced apart from one another, between which said windshield (5) extends; said first region (19) extending between said pillars (14, 15) and being contiguous with said second region (26).

3. The motor vehicle according to claim 2, wherein said first region (19) further comprises a central area (42) and a pair of opposite ends (41) opposite one another and delimited by respective segments (45) of corresponding pillars (14, 15); and
    said end areas (41) extending at a greater distance from said second region (26) than from said central area (42).

4. The motor vehicle according to claim 3, further comprising detection means (50) configured to detect a signal representative of the surroundings of said motor vehicle (1) in a position at the back and/or one the side of said windshield (5), with reference to said normal forward moving direction of said motor vehicle (1); and wherein said head-up display (30) being operatively connected to said detection means (50) and being configured to form a further virtual image (51) associated with said signal on at least one (41) of said end areas (41) of said first region (19).

5. The motor vehicle according to claim 1, wherein said head-up display (30) further comprises a plurality of projectors (40) configured to form respective virtual images (29) on said first region (19) of said windshield (5) and arranged side by side on said second region (26) of said dashboard (25).

6. The motor vehicle according to claim 1, wherein the head-up display (30) further comprises a processing unit (31) programmed, in case of urban and suburban use, to cause said projector (32) to form said virtual image (29) with said item of information associated with the operating condition of an engine (4) of said motor vehicle (1) and/or with a driver assistance system (60) of said motor vehicle (1).

7. The motor vehicle according to claim 6, wherein said processing unit (31) is programmed, in case of racing use on a track, to cause said projector (32) to form a further virtual image (29) with a further item of information associated with a preferential behaviour of said motor vehicle (1) and/or with the course of a competition.

8. The motor vehicle according to claim 1, wherein said second region (26) is curved.

9. The motor vehicle according to claim 1, wherein said first region (19) faces the outside of said motor vehicle (1) and is arranged, in use, above said dashboard (25).

10. A motor vehicle (1) comprising:
a passenger compartment (3) defining a seat (21) for a driver;
a dashboard (25) arranged within said passenger compartment (3), delimiting said passenger compartment (3) at the front with reference to a normal forward moving direction of said motor vehicle (1) and arranged in front of said seat (21);
a windshield (5) delimiting said passenger compartment (3) and contiguous with said dashboard (25); and
a head-up display (30) configured to form virtual images (29, 51) containing an item of information associated with an operating state of said motor vehicle (1) on a first region (19) on the windshield (5) at a zero distance from the windshield, wherein said first region (19) is in a darker colour than the remaining part of said windshield (5);
wherein said dashboard (25) comprising a curved second region (26) contiguous with a front windshield (16) of said windshield (5); and
wherein said head-up display (30) further comprises at least one projector (32) housed in said curved second region (26), and in that said first region (19) is defined by said windshield (5) and delimits said windshield (5) on the side of said dashboard (25); and
wherein said head-up display (30) is operatively connected to at least one detection means (50) configured to detect a signal representative of the surroundings of said motor vehicle (1) in a position at the back and/or on the side of said windshield (5), with reference to said normal forward moving direction of said motor vehicle (1), and is further configured to form a further virtual image (51) associated with said signal on at least one end area of said first region (19), such that said first region (19) is operable to display images representative of the scenario surrounding the motor vehicle (1) on the sides and at the back, thereby replacing rear-view mirrors.

11. The motor vehicle of claim 10, wherein said first region (19) is screen printed in black.

* * * * *

UNITED STATES PATENT AND TRADEMARK OFFICE
CERTIFICATE OF CORRECTION

Page 1 of 1

PATENT NO. : 12,447,822 B2
APPLICATION NO. : 18/329991
DATED : October 21, 2025
INVENTOR(S) : Alessandro Tanzi et al.

It is certified that error appears in the above-identified patent and that said Letters Patent is hereby corrected as shown below:

On the Title Page

Insert:
--(30) Foreign Application Priority Data
June 8, 2022 (IT) ...................... 102022000012149--

Signed and Sealed this
Twentieth Day of January, 2026

John A. Squires
*Director of the United States Patent and Trademark Office*